United States Patent
Jang

(10) Patent No.: US 9,715,316 B2
(45) Date of Patent: Jul. 25, 2017

(54) TOUCH PANEL

(71) Applicant: LG INNOTEK CO., LTD., Seoul (KR)

(72) Inventor: Jae Joon Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/726,894

(22) Filed: Jun. 1, 2015

(65) Prior Publication Data

US 2015/0346869 A1  Dec. 3, 2015

(30) Foreign Application Priority Data

Jun. 2, 2014 (KR) ........................ 10-2014-0067084

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2201/82* (2013.01); *G06F 2203/04102* (2013.01)

(58) Field of Classification Search
CPC ................. G06F 3/044; G06F 2201/82; G06F 2203/04102; G06F 3/0418
See application file for complete search history.

(56) References Cited

U.S. PATENT DOCUMENTS

| 8,946,026 | B2* | 2/2015 | Choi | ................. H01L 21/28088 257/E21.655 |
| 2002/0171634 | A1* | 11/2002 | Matsufusa | .............. G06F 3/044 345/173 |
| 2010/0171718 | A1* | 7/2010 | Denda | ..................... G06F 3/044 345/173 |
| 2012/0062511 | A1* | 3/2012 | Ishizaki | .................. G06F 3/044 345/174 |
| 2013/0341651 | A1* | 12/2013 | Kim | ..................... H01L 31/0232 257/84 |
| 2014/0054070 | A1* | 2/2014 | Ichiki | ..................... G06F 3/044 174/253 |

FOREIGN PATENT DOCUMENTS

KR  10-2010-0105935 A  10/2010
KR  10-2014-0023829 A  2/2014

* cited by examiner

*Primary Examiner* — Charles Hicks
(74) *Attorney, Agent, or Firm* — KED & Associates, LLP

(57) ABSTRACT

A touch panel includes a dummy electrode capable of protecting a circuit included in the touch panel for shielding against static electricity.

20 Claims, 7 Drawing Sheets

(a)

(b)

(a)

(b)

(c)

(d)

(a)

(b)

(a)　　　　　　　　　　(b)

(a)

(b)

TOUCH PANEL

CROSS-REFERENCE TO RELATED APPLICATION

This application claims priority under 35 U.S.C. §119 to Korean Patent Application No. 10-2014-0067084 filed Jun. 2, 2014, which is incorporated herein by reference in its entirety.

BACKGROUND

1. Field

The disclosure relates to a touch panel.

2. Background

As mobile terminals are miniaturized, many touch panel schemes for the more convenient input by a user have been used. A touch panel is referred to as an input device allowing a user to input a command as the user touches instructions, which are displayed on a screen of an image display device, with a hand or a tool. The touch panel is a substitute technology for a keyboard, a mouse, or a keypad, which is a conventional input device, and the utilization range of the touch panel has been continuously enlarged.

Because the touch panel has a weak characteristic against static electricity, the discharge of electricity, or moisture, components may be damaged or the performance may be deteriorated under the above circumstance, so problems exist when designing the touch panel. Particularly, the touch panel is affected by electrostatic discharge (ESD) caused in the fabrication process or in use. When the ESD occurs, the touch panel may be erroneously operated, and various devices provided on the touch panel may be damaged, so that the workability may be degraded.

As a prior art, there is Korean Unexamined Patent Publication No. 2014-0023829 (published on Feb. 27, 2014).

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
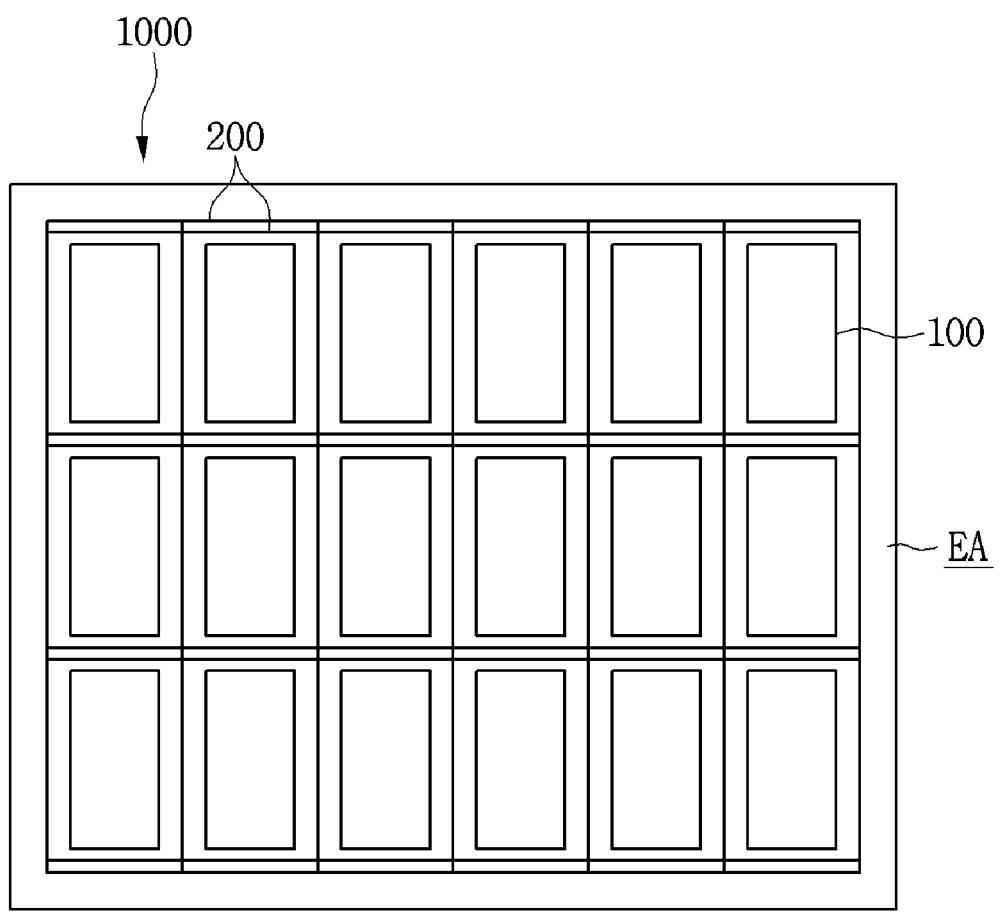
FIG. 1 is a plan view showing a panel mother substrate according to one embodiment of the disclosure.

FIG. 1 shows a mother substrate 1000 including a plurality of substrates before the substrates are separated from each other, and provided at an outer portion thereof with a dummy electrode 200. The mother substrate 1000 may be one panel or a wafer in which a plurality of substrates 100 are arranged. After process steps have been finished on the mother substrate 1000, the substrates 100 may be independently cut from the mother substrate 1000 to form one complete substrate 100. In other words, the mother substrate 1000 may include the substrates 100 and an extra area EAs provided at an outer portion of each substrate 100.

The mother substrate 1000 basically has the same attribute as that of the substrate 100. The mother substrate 1000 may be coated with a material used to form various electrodes. The mother substrate 1000 may include glass or plastic. For example, the mother substrate 1000 may include glass or plastic. In detail, the substrate 100 may include chemically tempered/semi-tempered glass, such as soda lime glass or aluminosilicate glass, reinforced plastic or flexible plastic, such as polyimide (PI), polyethylene terephthalate (PET), propylene glycol (PPG) or polycarbonate (PC), or sapphire.

The mother substrate 1000 may include an optical isotropic film. For example, the mother substrate 1000 may include cyclic olefin copolymer (COO), cyclic olefin polymer (COP), an optical isotropic polycarbonate (PC), or optical isotropic polymethylmethacrylate (PMMA).

The sapphire has superior electric characteristics, such as permittivity, so that a touch response speed may be remarkably increased and a space touch, such as hovering, may be easily implemented. The sapphire has high surface hardness, so the sapphire may be used for the mother substrate 1000. The hovering signifies a technique of recognizing coordinates even at a short distance from a display.

The mother substrate 100 may include a flexible mother substrate 1000 having a flexible characteristic. The mother substrate 1000 may be a curved or bended mother substrate 1000. In other words, the touch window including the mother substrate 1000 may have flexible, curved or bended characteristics. Accordingly, the touch window according to the embodiment can be easily carried and variously designed.

Figure 4:
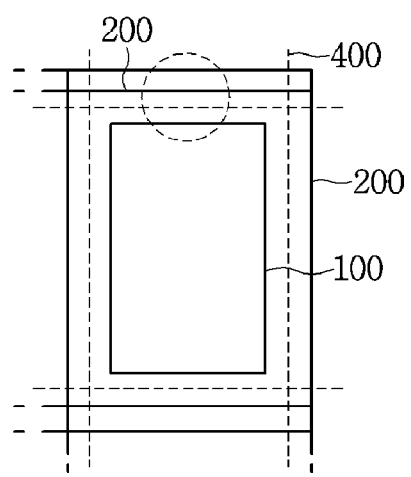
FIG. 4 shows one touch panel separated from a mother substrate and an individual separated substrate.
Figure 4:
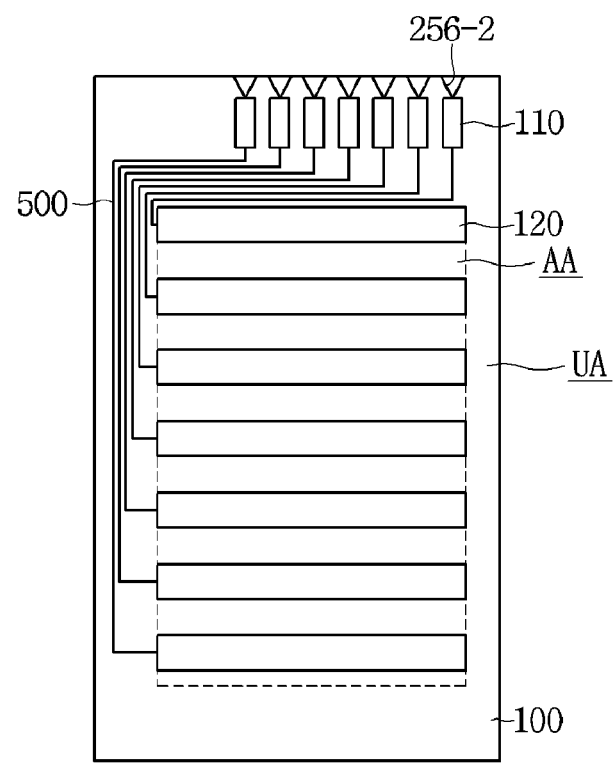

Referring to FIG. 4, the substrate 100 separated from the mother substrate 1000 may include an active area AA and an unactive area UA defined therein. An image may be displayed in the active area AA, and the image may not be displayed in the unactive area UA provided at a peripheral portion of the active area AA.

A position of an input device or a finger may be detected in at least one of the active area AA and the unactive area UA. If the input device, such as the finger, touches the touch window, capacitance variation may occur in an area touched by the input device, so the area is detected as the touch position. The substrate 100 may include a cover substrate.

A dummy electrode 200 may be provided on each substrate 100. The dummy electrode 200 may be provided at an outer portion of each substrate 100. The dummy electrode 200 may be provided at the extra area EA provided at the outer portion of the substrate 100, and a portion of the dummy electrode 200 extends to an the outer portion of the substrate 100 so that the portion of the dummy electrode 200 may be provided on the substrate 100.

The dummy electrode 200 may protect a sensing electrode and a wire electrode provided on the substrate 100 from electrostatic discharge (ESD).

The dummy electrode 200 may include a conductive member. For example, the dummy electrode 200 may include various metals. The dummy electrode 200 may be removed when the substrate 100 is separated from the mother substrate 1000, and a remaining dummy electrode 200 on the substrate 100 may include an opaque metallic material having high conductivity since the remaining dummy electrode 200 is provided in the unactive area UA.

For example, the dummy electrode 200 may include at least one of chromium (Cr), nickel (Ni), copper (Cu), aluminum (Al), silver (Ag), molybdenum (Mo), gold (Au), titanium (Ti), copper (Cu), and the alloy thereof.

The dummy electrode 200 may be realized by depositing a metallic material, such as Au, Ag, or Cu, having excellent conductivity on the mother substrate 1000. In general, the dummy electrode 200 is realized using a conductive material utilized when fabricating the touch panel, so that the process convenience can be ensured. For example, the dummy electrode 200 may include at least one of metallic oxides such as indium tin oxide, indium zinc oxide, copper oxide, tin oxide, zinc oxide, and titanium oxide. The dummy electrode 200 may include a nanowire, a photosensitive nanowire film, carbon nanotube (CNT), graphene, conductive polymer or the mixture thereof.

Meanwhile, the dummy electrode 200 may be formed by laminating metal on the metallic oxide. For example, the dummy electrode 200 may be realized by laminating a metallic layer including Ag or Cu on a conductive material layer including the metallic oxide such as ITO. A molybdenum (Mo) layer may be further interposed between the conductive material layer and the metallic layer to enhance an adhesive strength.

Figure 2:
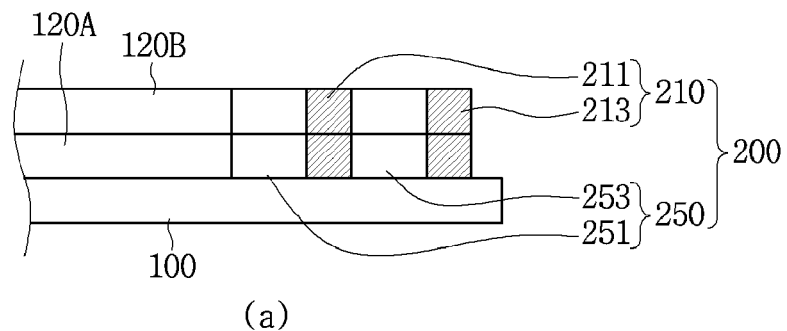
FIG. 2 shows sectional views of a touch panel having a dummy electrode, which has a structure varying depending on types of the touch panel.
Figure 2:
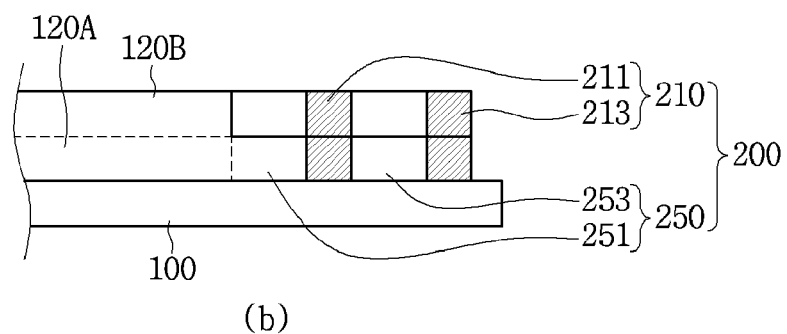
Figure 2:
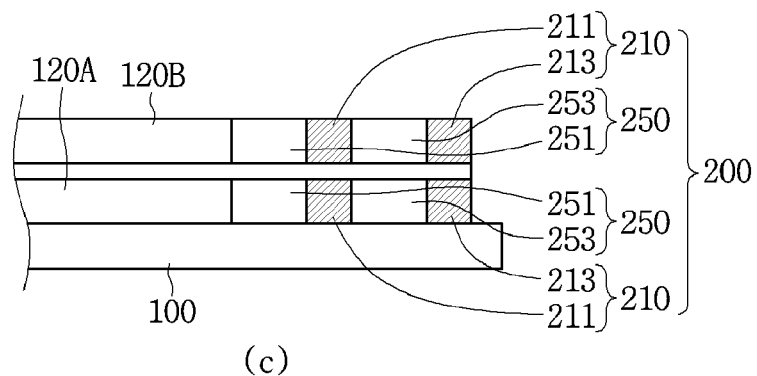
Figure 2:
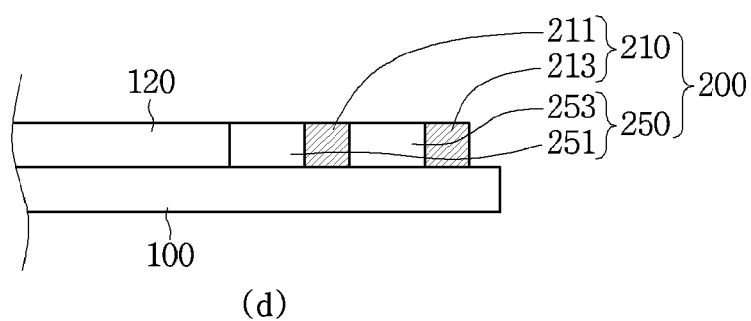
Figure 3:
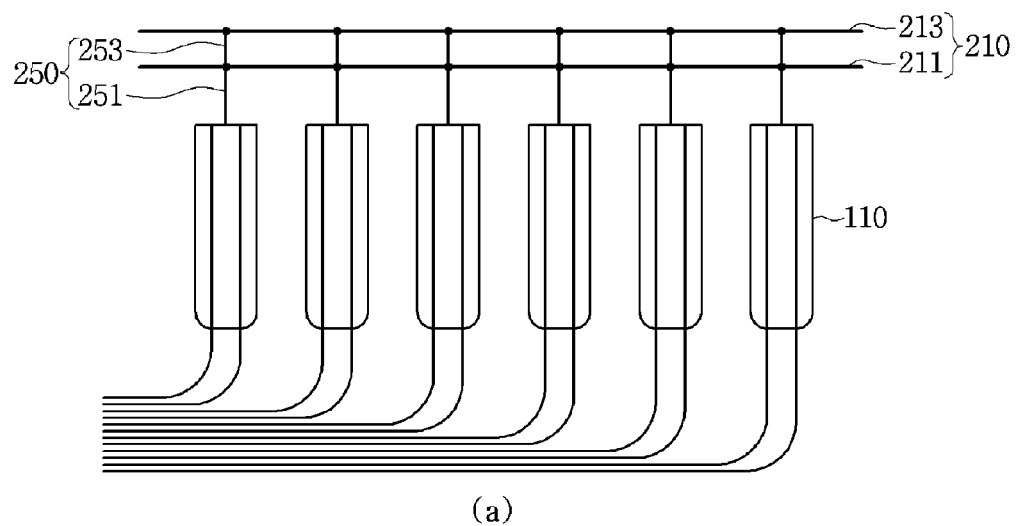
FIG. 3 shows an individual touch panel according to one embodiment of the disclosure and a connection shape between the touch panel and a dummy electrode.
Figure 3:
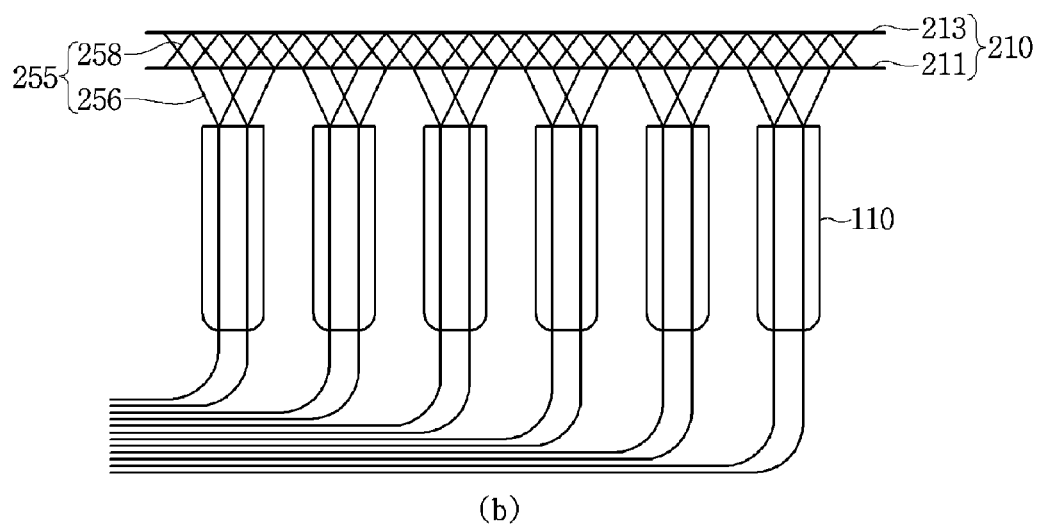

Referring to FIGS. 2 to 3, the dummy electrode 200 may include a first dummy electrode 210 and a second dummy electrode 250. Two types of dummy electrodes 200, such as the first and second dummy electrodes 210 and 250, may be wired on the mother substrate 1000.

The first dummy electrode 210 may be wired at an outer portion of each touch panel on the mother substrate 1000. For example, the first dummy electrode 210 is spaced apart from each side of the substrate 100 by a preset distance in parallel to the side of the substrate 100, so that the first dummy electrode 210 may be provided in the extra area EA of the mother substrate 1000.

The second dummy electrode 250 may connect a wire pad 110 of the substrate 100 with the first dummy electrode 210. For example, the second dummy electrode 250 may be provided in the extra area EA of the mother substrate 1000 and extend to the wire pad 110 provided on the substrate 100. In other words, the second dummy electrode 250 may be provided on the extra area EA and an unactive area UA of the substrate 100.

The second dummy electrode 250 has a configuration to minimize damage caused by internal static electricity of the substrate 100 as well as the external static electricity of the substrate 100. The second dummy electrode 250 may be maintained at the grounding state in the state that the second dummy electrode 250 is connected with the first dummy electrode 210 or maintained at the grounding state regardless of the grounding state of the first dummy electrode 210 by independently grounding the second dummy electrode 250.

Meanwhile, the second dummy electrode 250 has resistance different from that of the first dummy electrode 210. The resistance is a physical quantity to represent the degree of interrupting the flow of current, and may vary with both of the inherent characteristic of a material constituting the dummy electrode 200 and the size of the dummy electrode 200. When the second dummy electrode 250 is realized using a conductive material different from that of the first dummy electrode 210 or realized with a line width different from that of the first dummy electrode 210, the second dummy electrode 250 may have resistance different from that of the first dummy electrode 210.

The first and second dummy electrodes 210 and 350 have resistances different from each other as described above, so that the burden of the dummy electrode to shield static electricity having high voltage of tens thousands of volts can be reduced. For example, the first dummy electrode 210 has a lower resistance, and the second dummy electrode 250 has a higher resistance, so that electrostatic charges are primarily discharged through the first dummy electrode 210. If the first dummy electrode 210 is damaged, the second electrode 250 may secondarily ground the electrostatic charges.

For example, the size (for example, the width and/or the thickness of the electrode) of the first dummy electrode 210 may be larger than the size of the second dummy electrode 250. In addition, the conductivity of the conductive material included in the first dummy electrode 210 may be greater than that of the conductive material included in the second dummy electrode 250. In addition, the line width of the first dummy electrode 210 may be wider than that of the second dummy electrode 250.

The resistance per unit length of the first dummy electrode 210 may be lower than that of the second dummy electrode 250 by forming the first and second dummy electrodes 210 and 250 different from each other in at least one of size, a conductive material, and a line width. The number of dummy electrodes 200 may be increased if necessary and provided at an outer portion of the substrate 100.

As shown in FIG. 1, at least two first antistatic electrodes 200 may be doubly provided in parallel to each other in the state that the first antistatic electrodes 200 are spaced apart from each other by a predetermined distance. Static electricity can be more effectively shielded by the at least two antistatic electrodes 200 arranged described above.

FIG. 2 shows sectional views to explain a method of forming the dummy electrode 200 according to various fabrication types of touch panels. FIG. 2 shows cross sectional views of the substrate 100 according to the fabrication types of the touch panels. FIG. 2 shows views to explain various types of touch panels according to the arrangement relations among the substrate, the sensing electrode, and the dummy electrode 200, and the wire and the wire pad are omitted for the convenience of explanation. In other words, according to the touch panel of the embodiment, the wire and the wire pad may be further interposed between the sensing electrode and the dummy electrode 200.

In detail, FIG. 2(a) is a sectional view showing a touch panel having a GFF structure in which X and Y axis sensing electrodes 120A and 120B are patterned in a transparent electrode film (ITO film), and the transparent electrode film is laminated on the substrate 100. In this case, the dummy electrode 200 is formed together with a wire extending from the sensing electrodes 120A and 120B when the wire extending from the sensing electrodes 120A and 120B is formed. Accordingly, the dummy electrode 200 is formed on the same layer as that of the transparent electrode film in which the X axis sensing electrode 120A or the Y axis sensing 120B exists. As shown in FIG. 2(a), the first dummy electrode 210 and the second dummy electrode 250 are formed on the same layers as those of the Y sensing electrode 120B and the X sensing electrode 120A, respectively, on the substrate 100.

FIG. 2(b) is a sectional view showing a G1F type of a touch panel. The G1F type of the touch panel is fabricated by laminating one sheet of a transparent electrode film on one substrate. In detail, the X axis sensing electrode 120A may be deposited on the substrate 100, and a transparent electrode film having the Y axis sensing electrode 120B, which is patterned, is laminated on the X axis sensing electrode 120A. Meanwhile, as described above, since the dummy electrode 200 is formed simultaneously with the wire extending from each sensing electrode 120 when the wire extending from the sensing electrode 120 is formed. Accordingly, the dummy electrodes 200 may be formed on the relevant layers when the X axis sensing electrode 120A is deposited.

FIG. 2(c) is a sectional view showing a GG2 type of a touch panel, and the GG2 type of the touch panel is fabricated by depositing an X axis sensing electrode and a Y axis sensing electrode on two sheets of substrate. The sensing electrode 120 and the insulating layer 130 are deposited so that a lamination structure of the X axis sensing electrode 120A-insulating layer 130-Y axis sensing electrode 120B is formed on one surface of the first substrate 100, and a second substrate (not shown) is bonded to an opposite surface of the first substrate 100. Meanwhile, in the GG2 type of the touch panel, the dummy electrodes 200 are formed on the same layer as those of the X axis sensing electrode 120A and the Y axis sensing electrode 120B. In detail, the dummy electrodes 200 are formed in the structure shown in FIG. 2(c) in detail.

FIG. 2(d) is a sectional view showing a GF2 type of a touch panel. The GF2 type of the touch panel is fabricated by arranging one sheet of a transparent electrode film on one substrate, and an X axis sensing electrode and a Y axis sensing electrode 120 may be patterned on both surfaces of the transparent electrode film. Meanwhile, in the GF2 type of the touch panel, the dummy electrode 200 may be formed simultaneously with a wire extending from each sensing electrode 120 when the wire extending from the sensing electrode 120 is formed after the sensing electrodes 120 is patterned in the transparent electrode film. In this case, as the sensing electrodes 120 of two axes are formed on one sheet of the transparent electrode film, an additional insulating layer may exist in a wire part extending from the sensing electrodes 120, and the dummy electrodes 200 may be formed on both surfaces of the insulating layer. FIG. 3 is an enlarged view showing a certain substrate 100 among a plurality of substrates 100 provided in the above-described mother substrate 1000 of FIG. 1 and the dummy electrodes 200 connected with the relevant substrate 100.

FIG. 3 shows a plurality of wire pads 110 provided in the substrate 100, a first dummy electrode 210 wired at an upper portion of the substrate 100, and a second dummy electrode 250 to electrically connect the wire pads 110 with the first dummy electrode 210.

In addition, the first dummy electrode 210 may include at least two sub-electrodes. For example, as shown in FIG. 3, the first dummy electrode 210 may include a first sub-first dummy electrode 211 and a second sub-first dummy electrode 213. In addition, the first sub-first dummy electrode 211 and the second sub-first dummy electrode 213 may be doubly provided in parallel to each other in the state that the first sub-first dummy electrode 211 and the second sub-first dummy electrode 213 are spaced apart from each other by a predetermined interval. The at least two dummy electrodes 200 arranged as described above can more effectively shield static electricity.

In addition, the second dummy electrode 250 may include at least two sub-electrodes. In detail, the second dummy electrode 250 may include sub-electrodes in number equal to the number of the sub-electrodes of the first dummy electrode 210. For example, the second dummy electrode 250 may include a first sub-second dummy electrode 251 and a second sub-second dummy electrode 253. In detail, the first sub-second dummy electrode 251 may connect the first sub-first dummy electrode 211 with the second sub-first dummy electrode 213. In addition, the second sub-second dummy electrode 253 may connect the second sub-first dummy electrode 213 with a wire pad 110. At least two dummy electrodes 200 arranged as described above may more effectively shield static electricity.

The wire pad 110 may be connected with connection lines extending from a plurality of sensing electrodes or touch electrodes. The wire pad 110 may be provided at an upper portion, a lower portion, or a side portion of the substrate 100 according to designs, and the position of the dummy electrode 200 to prevent static electricity from being introduced may be varied depending on the arrangement position of the wire pad 110.

The dummy electrode 200 is connected with the wire pad 110 because most static electricity is introduced into the substrate 100 through the wire pad 110 provided on the surface of the substrate 100 when the static electricity occurs during a process such as a roll-to-roll (R2R). The high-voltage static electricity introduced into the substrate 100 through the wire pad 110 may cause damage not only to the wire pad 110, but also to the sensing electrode 120 connected with the wire pad 110, and a micro-circuit extending from the sensing electrode 120. Accordingly, the damage of the elements can be prevented by connecting the wire pad 110 with the dummy electrode 200.

Particularly, in match with the latest trends of a mobile terminal design to minimize a Bezel area, many researches and studies have been performed to form micro-size connection lines wired in the Bezel area. When the micro-size connection lines are used, damage during the fabrication process caused by the introduction of static electricity may be significantly fatal. Accordingly, the static electricity protection by the connection between the dummy electrode 200 and the wire pad 110 may be a very important problem.

For this reason, the mother substrate 1000 and the substrate 100 may have wiring so that the first and second dummy electrodes 210 and 250 are electrically connected with the wire pads 110 as shown in FIG. 3. In detail, the first dummy electrode 210 may be provided at an outer portion of the wire pads 110, and the second dummy electrodes 250 are interposed between the first dummy electrode 210 and the wire pads 110, respectively.

FIG. 2(a) shows that the first dummy electrodes 210 having a double structure are wired in parallel to each other at an upper portion of the substrate 100, in more detail, above the wire pad 110 provided in the substrate 100, and the second dummy electrode 250 connects the first electrode 210 with the wire pad 110.

As described above, the first and second dummy electrodes 210 and 250 may be realized with mutually different resistances. Particularly, the first and second dummy electrodes 210 and 250 may be realized with mutually different resistances by adjusting the line widths of the first and second dummy electrodes 210 and 250. As shown in FIG. 3(a), since the first dummy electrode 210 has a line width thicker than that of the second dummy electrode 250, the first dummy electrode 210 has a lower resistance and the second dummy electrode 250 has a higher resistance according to the relationship between the shape of a conductor and the resistance.

As shown in FIG. 3(b), a second dummy electrode 255 may be realized in a mesh structure. When the second dummy electrode 255 is realized in the mesh structure as described, the line width of the dummy electrode can be more finely formed, which is advantageous in terms of resistance. Accordingly, the static electricity can be more effectively shielded.

Meanwhile, although description has been made with reference to FIG. 3 regarding that the wire pad 110 of the substrate 100 and the first and second dummy electrodes are directly connected with each other according to the embodiment, the first and second dummy electrodes may be spaced apart from each other according to another embodiment. In other words, although the second dummy electrode 250 basically connects the first dummy electrode 210 with the wire pad 110, the dummy electrodes 200 may be wired in the structure in which the second dummy electrode 250 is disconnected from the wire pad 110. In this case, although the wire pad 110 may not be grounded since the wire pad 110 is not directly connected with the dummy electrode, the wire pad 110 can shield static electricity generated from the outside to some degree. Particularly, when each substrate 100 is separated from the mother substrate 1000, the substrate 100 may be cut from the mother substrate 1000 in such a manner that the trace of the dummy electrode does not remain.

FIG. 4 shows that one substrate 100 is separated from the mother substrate 1000. As described above, a plurality of substrates 100 are formed on one mother substrate 1000, and individually cut and separated from the mother substrate 1000 finally, so that one complete substrate 100 is produced. In this case, the cutting and separating of the substrate 100 from the mother substrate 1000 having the first and second dummy electrodes wired therein are shown in FIG. 4(a).

The substrate 100 is separated to downsize a Bezel. Accordingly, it may be preferred that only the substrate 100 is separated from the mother substrate 1000 except for the first dummy electrode 210. Accordingly, the substrate 100 may be cut so that the first dummy electrode 210 does not remain on the separated substrate.

FIG. 4(b) shows the individual substrate 100 separated from the mother substrate 1000 and components formed in the substrate 100. In detail, the substrate 100 may be provided therein with the sensing electrode 120, a wire part including a wire 500 and the wire pad 110, and a remaining second dummy electrode 256-2.

In detail, as shown in FIG. 4(b), the remaining second dummy electrode 256-2 may be provided at an outer portion of one side of the substrate 100. In this case, the remaining second dummy electrode 256-2 may have the shape of making contact with an outermost side of the substrate 100 while facing the outermost side of the substrate 100. In other words, the remaining second dummy electrode 256-2 has the above shape since a cutting line 400, which serves as a guide line in the cutting of the substrate 100, is interposed between the first dummy electrode 210 and the wire pad 110, that is, passes through the second dummy electrode 250. In other words, the remaining second dummy electrode 256-2 may be a second dummy electrode 250 provided on the substrate 100.

Therefore, according to the embodiment, the remaining second dummy electrode 256-2 has one end that may be connected with the wire pad 110, and an opposite end that may extend to the outermost side of the substrate 100. In addition, the opposite end of the remaining second dummy electrode 256-2 may be open through cutting. In other words, the opposite end of the remaining second dummy electrode 256-2 is open, so that current may not flow through the remaining second dummy electrode 256-2 thereafter. In addition, the remaining second dummy electrode 256-2 may be provided at the shortest distance between the wire pad 110 and the outermost side of the substrate 100. In other words, the extension direction of the remaining second dummy electrode 256-2 may be perpendicular to the outermost side of the substrate 100.

Meanwhile, when the second dummy electrode 250 has a mesh shape, at least two remaining second dummy electrodes 256-2 are drawn from the wire pad 110 to extend to edges of the substrate 100 in directions different from each other. In other words, a plurality of remaining second dummy electrodes 256-2 may be connected with one wire pad 110, and may extend from one wire pad 110 in the directions different from each other. In this case, as shown in FIG. 4, the extension direction of each remaining second dummy electrode 256-2 may be inclined from the direction perpendicular to the outermost side of the substrate 100.

Meanwhile, the remaining second dummy electrode 256-2 may be connected with one end of the wire pad 110. In this case, an opposite end opposite to the one end of the wire pad 110 may be connected with the wire 500. In other words, the second dummy electrode 250 extends from the extra area EA provided at an outside of the substrate 100, so that the second dummy electrode 250 may be connected with the one end of the wire pad 110, and the wire 500 may extend from an inner part of the substrate 100 so that the wire 500 may be connected with the opposite end of the wire pad 110.

Figure 5:
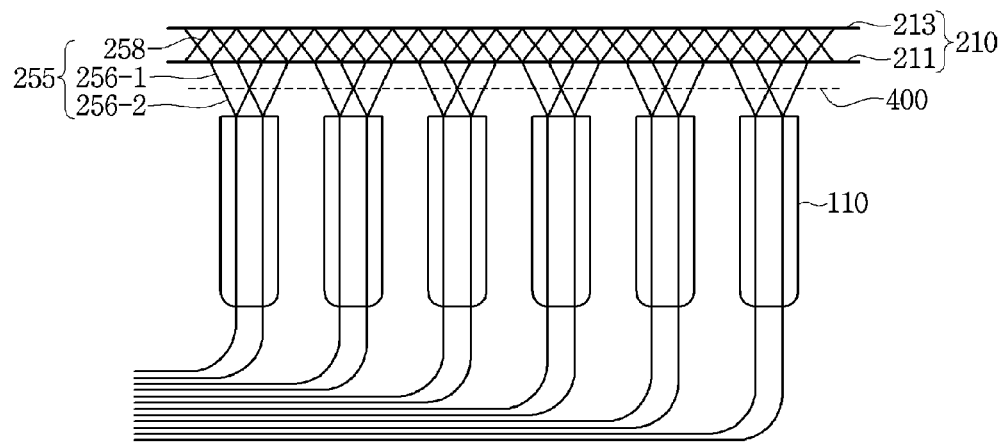
FIG. 5 shows enlarged views of the cutting between a dummy electrode and a touch panel pad when a touch panel is individually separated.
Figure 5:
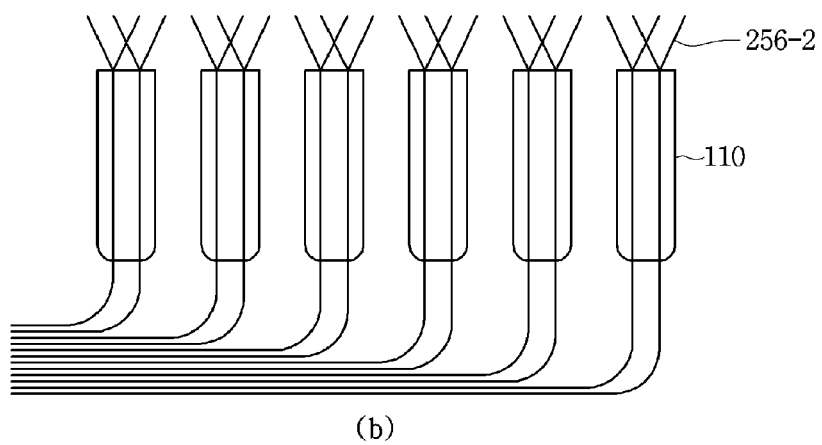

Hereinafter, the position of the cutting line 400 utilized when the substrate 100 is separated from the mother substrate 1000 and the shape of the dummy electrode 200 will be described with reference to FIG. 5 in more detail.

FIG. 5(a) shows each substrate 100 separated from the mother substrate 1000 along the cutting line 400 provided on the outer portion of mother substrate 1000. In particular, the cutting line 400 exists at the boundary between the first dummy electrode 210 and the substrate 100, so that the first dummy electrode 210 may be excluded in the cutting of the substrate 100.

Meanwhile, the separated shape of the second dummy electrode 250 may vary depending on the positions of the cutting line 400. FIG. 5(b) shows the second dummy electrode 255 remaining on the substrate 100 provided in the final stage when the substrate 100 is separated along the cutting line 400 marked in FIG. 5(a). In other words, when antistatic dummy electrodes, particularly, the second dummy electrode 250 among the antistatic dummy electrodes is utilized according to the embodiment, the remaining second dummy electrode 256-2, which is a trace of the second dummy electrode 250, may exist on the final substrate 100 as shown in FIG. 5(b). When the substrate 100 has the remaining second dummy electrode 256-2, it may be deduced that the dummy electrode 200 for static electricity protection is used.

One end of the remaining second dummy electrode 256-2 may be connected with an opposite end of the wire pad 110. In addition, the opposite end of the second dummy electrode 256-2 may make contact with the outermost side of the substrate 100 while facing the outermost side of the substrate 100. In addition, the opposite end of the remaining second dummy electrode 256-2 is open, so that current may not flow through the remaining second dummy electrode 256-2.

Since current does not flow through the remaining second dummy electrode 256-2, the remaining second dummy electrode 256-2 may not be involved in the operation of a touch panel when the substrate 100 is utilized for the touch panel. In other words, the remaining second dummy electrode 256-2 may be a meaningless component in the touch panel which is completed in the final stage. Nevertheless, the remaining second dummy electrode 256-2 provided at an outer portion of the substrate 100 is important evidence representing that the dummy electrode 200 is employed in the mother substrate 1000

Hereinafter, one example of the touch device employing the touch panel according to the embodiment will be described with reference to FIGS. 6 to 9.

Figure 6:
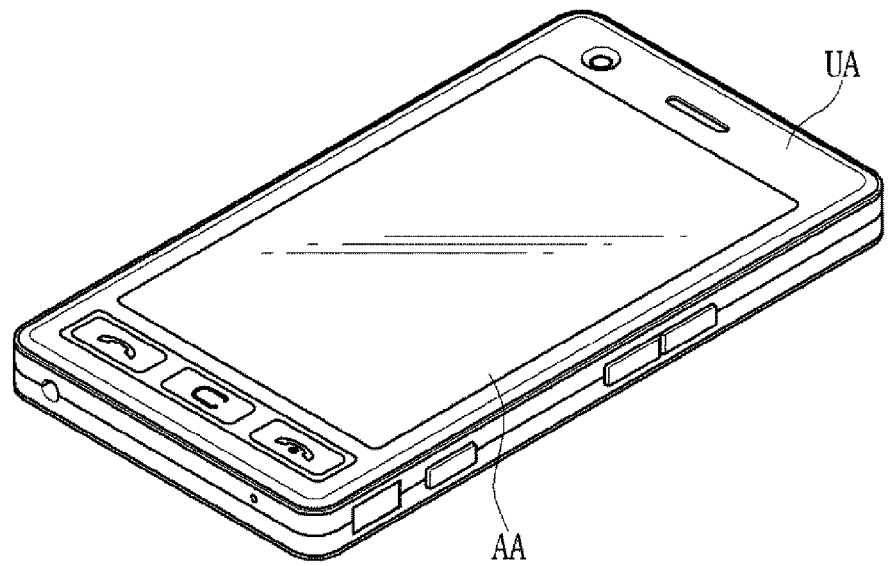
FIGS. 6 to 9 are views showing one example of a touch device employing a touch panel according to one embodiment of the disclosure.

Referring to FIG. 6, a mobile terminal is illustrated as an example of the touch device. The mobile terminal may include the active area AA and the unactive area UA. The active area AA is an area in which a touch signal is sensed due to the touch by a finger, and an instruction icon pattern part and a logo may be formed in the unactive area UA.

Figure 7:
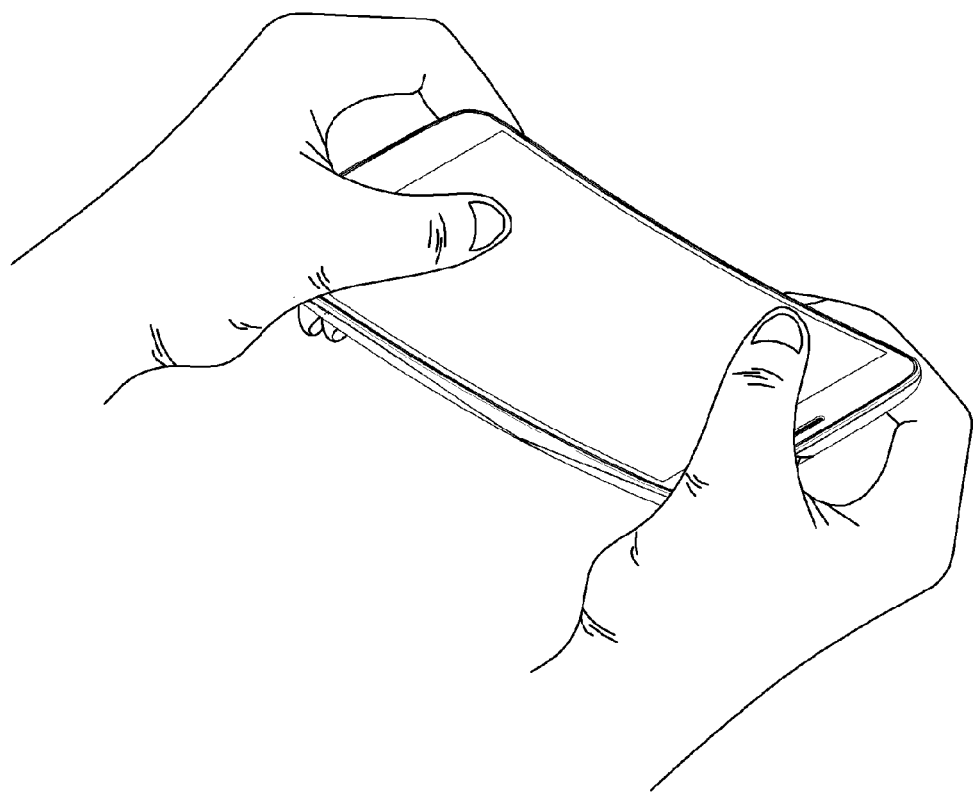

Referring to FIG. 7, the touch panel may include a flexible touch panel. Thus, the touch device including the touch panel may be a flexible touch device which may be bent or curved by a hand of a user. The flexible touch device may be applied to a wearable touch device.

Figure 8:
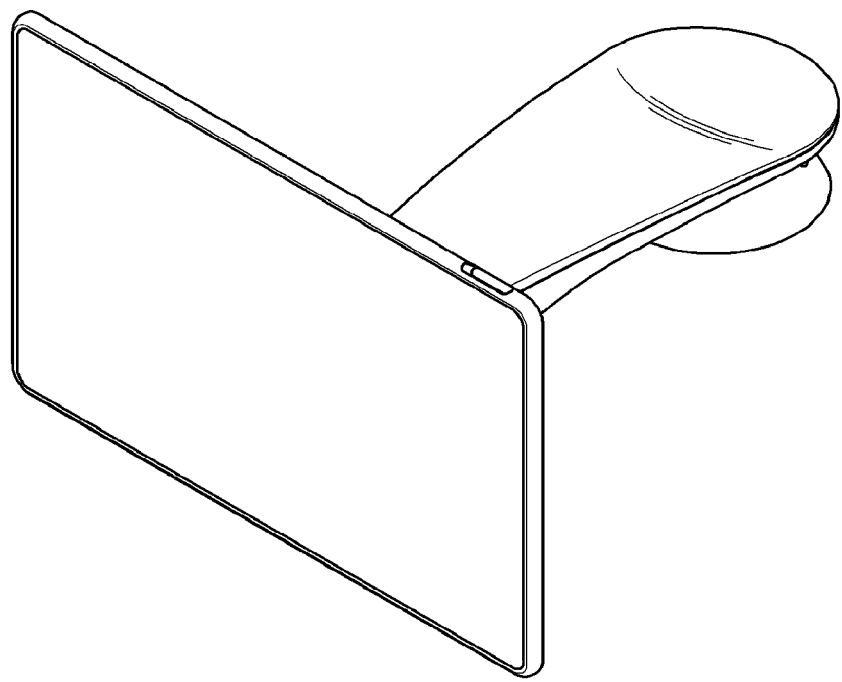

Referring to FIG. 8, the touch panel may be applied to a vehicle navigation system as well as the touch device, such as the mobile terminal.

Figure 9:
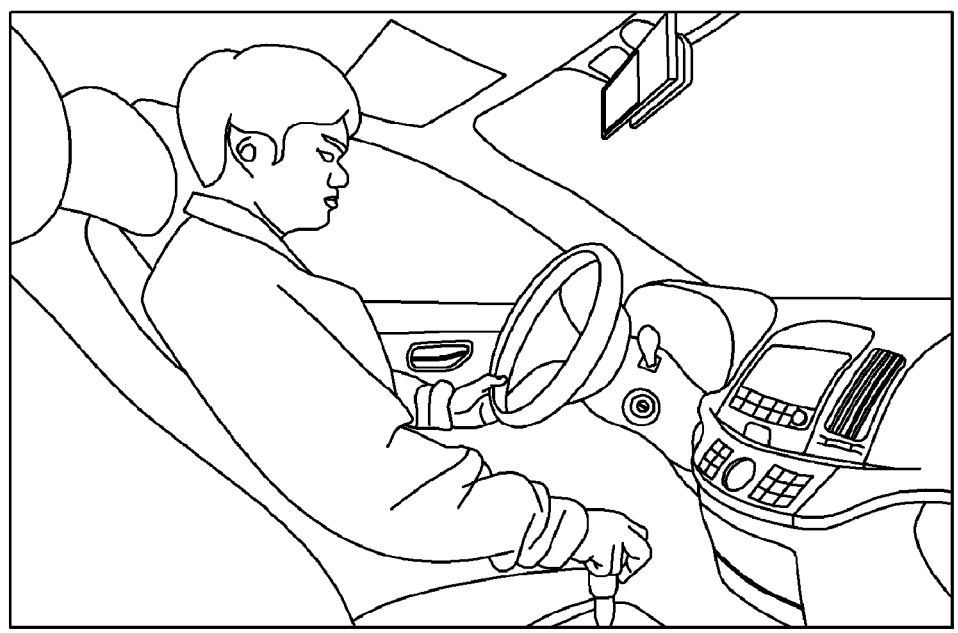

Referring to FIG. 9, the touch panel may be applied inside a vehicle. In other words, the touch panel may be applied to various parts in the vehicle where the touch panel is applied. Accordingly, the touch panel is applied to a dashboard as well as a PND (Personal Navigation Display), thereby realizing a CID (Center Information Display). However, the embodiment is not limited thereto. In other words, the touch panel may be used in various electronic products.

The disclosure is suggested in order to solve the above problem occurring in the related art, and provides a touch panel having a dummy electrode wired at an outer portion of the touch panel for the protection of static electricity.

In addition, the disclosure provides a touch panel capable of doubly protecting the introduction of static electricity by wiring first and second dummy electrodes having mutually different resistances, respectively.

Further, the disclosure provides a touch panel capable of effectively preventing the introduction of static electricity by configuring a second dummy electrode, which connects a device provided on the touch panel with a first dummy electrode, in a mesh shape.

In order to accomplish the object of the disclosure, there is provided a touch panel to prevent the instruction of static electricity. However, those skilled in the art should understand that the category of the disclosure is not limited to the original meaning of words, but can be variously interpreted within the scope of the concept of the disclosure to be described below.

According to one aspect of the disclosure, the touch panel includes a sensing electrode on a substrate, a wire part connected with the sensing electrode and extending out of the substrate, and a dummy electrode connected with the wire part. The wire part and the dummy electrode are conductors including an identical material.

In addition, according to the touch panel, the wire part may include a wire pad connected with a wire, and the wire pad may be realized to be connected with the dummy electrode Further, the dummy electrode is connected with the wire pad on at least two contact points.

In addition, at least two dummy electrodes may cross each other.

Meanwhile, the touch panel may further include the wire part and a second dummy electrode formed at an outside of the dummy electrode.

Meanwhile, the wire part may include a wire pad connected with the wire. The dummy electrode may be realized to be spaced apart from the wire pad.

In addition, according to the touch panel, the dummy electrode may include a bonding layer or a transparent electrode layer.

According to another aspect of the disclosure, the touch panel according to the disclosure may include a sensing electrode on a substrate, a wire part connected with the sensing electrode and extending out of the substrate, and a dummy electrode interposed between the wire pad and one side of the substrate and connected with the one side of the substrate.

In addition, according to the touch panel, the wire part may include a wire pad connected with a wire. The wire pad may be connected with the dummy electrode.

As described above, according to the disclosure, the touch panel can be prevented from being damaged by preventing the static electricity, which may be caused in the fabrication process of the touch panel, from being introduced into the touch panel, or distributing static electricity having high voltage.

In addition, according to the disclosure, the touch panel can be more effectively protected by doubly arranging dummy electrodes to prevent the introduction of the static electricity.

Further, according to the disclosure, the dummy electrode having the higher resistance can be provided by configuring a connection line in the mesh shape between dummy electrodes or between the dummy electrode and the touch panel pad.

When a predetermined part "is connected to" another part, this means not only that the predetermined part is directly connected to another part, but also that the predetermined is indirectly connected to another part while interposing another component between the predetermined part and another part. In addition, when a predetermined part "includes" a predetermined component, the predetermined part does not exclude other components, but may further include other components unless indicated otherwise.

It will be understood that, when a layer (film) is referred to as being "on" or "under" another layer (film), region, it can be "directly" or "indirectly" on the other layer (film), or one or more intervening layers may also be present. Such a position of each layer will be described with reference to the drawings.

The terms "first" and "second" may be used to explain various components, and the components are not limited to the terms. The terms are used only to distinguish one element from another element.

In addition, the touch panel refers to a device to detect information input through a touch scheme. The touch panel may be realized in the form of a touch window provided in an image display device, such as a cathode ray tube (CRT), a liquid crystal display (LCD), a light-emitting diode (LED), a field emission display (FED), a plasma display panel (PDP), or an electro luminescence device (ELD), so that a user may input touch information while recognizing the image display device. In addition, the touch panel may be realized in the form of a simple input device formed on the surface of an electronic device without cooperation with the image display device so that the user can input only simple touch information.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
a substrate comprising an active area and an unactive area outside the active area;
a sensing electrode on the substrate;
a wiring connected with the sensing electrode and extending out of the active area of the substrate; and
a dummy electrode on the unactive area,
wherein the wiring includes a wire pad connected with a wire to the sensing electrode,
wherein one end of the dummy electrode is connected with the wire pad and an opposite end of the dummy electrode is open,
wherein the dummy electrode is provided further out towards the edge of the substrate than the wire pad, and
wherein the wiring and the dummy electrode include a same material.

2. The touch panel of claim 1, wherein the wire pad is connected with the dummy electrode on the unactive area.

3. The touch panel of claim 2, which the dummy electrode is connected with the wire pad by at least two contact points.

4. The touch panel of claim 1, wherein at least two dummy electrodes cross each other.

5. The touch panel of claim 1, further comprising a second antistatic electrode formed outside the wiring and the dummy electrode.

6. The touch panel of claim 1, wherein the wiring includes a wire pad connected with a wire to the sensing electrode, and the dummy electrode is spaced apart from the wire pad.

7. The touch panel of claim 1, wherein the dummy electrode includes a bonding layer or a transparent electrode layer.

8. A touch panel comprising:
a substrate comprising an active area and an unactive area outside the active area;
a sensing electrode on the substrate;
a wire part connected with the sensing electrode and extending out of the substrate; and
a dummy electrode on the unactive area interposed between the wire part and one side of the substrate and connected with the one side of the substrate,
wherein the dummy electrode is connected to the sensing electrode,
wherein the wire part includes a wire pad connected with the wire part,
wherein one end of the dummy electrode is connected with the wire pad and an opposite end of the dummy electrode is open, and
wherein the dummy electrode is provided further out towards the edge of the substrate than the wire pad.

9. The touch panel of claim 8, wherein the wire pad is connected with the dummy electrode on the unactive area.

10. A touch panel comprising:
a substrate comprising an active area and an unactive area outside the active area;
a sensing electrode on the active area;
a plurality of wires connected with the sensing electrode and provided on the unactive area;
a plurality of wire pads provided on the unactive area and connected with the plurality of wires; and
a plurality of dummy electrodes on the unactive area,
wherein first ends of the dummy electrodes are connected with first ends of the wire pads, respectively, and second ends of the dummy electrodes are open and provided at an outermost side of the substrate, and
wherein the dummy electrodes are connected to the sensing electrode and are provided further out towards the edge of the substrate than the wire pads.

11. The touch panel of claim 10, wherein the plurality of wires is connected with second ends of the wire pads, opposite to the first ends of the wire pads connected with the dummy electrodes.

12. The touch panel of claim 10, wherein the second ends of the dummy electrode are open.

13. The touch panel of claim 10, wherein the dummy electrodes are connected with the wire pads, respectively.

14. The touch panel of claim 13, wherein the dummy electrodes connected with the wire pads, respectively, extend in directions different from each other.

15. The touch panel of claim 14, wherein the extension directions of the dummy electrodes are inclined from a direction perpendicular to the outermost side of the substrate.

16. The touch panel of claim 10, wherein the dummy electrodes have a mesh shape.

17. The touch panel, of claim 10, wherein the dummy electrodes extend in a direction perpendicular to the outermost side of the substrate.

18. The touch panel of claim 10, wherein the dummy electrodes include a conductive material identical to a material constituting the wire.

19. The touch panel of claim 10, wherein, the dummy electrodes include a conductive material identical to a conductive material constituting the sensing electrode.

20. The touch panel of claim 10, wherein the dummy electrodes include a metallic oxide layer and a metallic layer laminated on the metallic oxide layer.

* * * * *